US012752532B2

(12) United States Patent
Murata

(10) Patent No.: US 12,752,532 B2
(45) Date of Patent: Oct. 6, 2026

(54) NOZZLE HEAD, MANUFACTURING METHOD OF NOZZLE HEAD, AND DROPLET DISCHARGING DEVICE

(71) Applicant: SIJTechnology, Inc., Tsukuba (JP)

(72) Inventor: Kazuhiro Murata, Tsukuba (JP)

(73) Assignee: SIJTechnology, Inc., Tsukuba (JP)

( * ) Notice: Subject to any disclaimer, the term of this patent is extended or adjusted under 35 U.S.C. 154(b) by 176 days.

(21) Appl. No.: 18/541,419

(22) Filed: Dec. 15, 2023

(65) Prior Publication Data

US 2024/0131843 A1 Apr. 25, 2024
US 2024/0227397 A9 Jul. 11, 2024

Related U.S. Application Data

(63) Continuation of application No. PCT/JP2022/013972, filed on Mar. 24, 2022.

(30) Foreign Application Priority Data

Jun. 21, 2021 (JP) ................................ 2021-102675

(51) Int. Cl.
*B41J 2/14* (2006.01)
*B41J 2/16* (2006.01)

(52) U.S. Cl.
CPC ............. *B41J 2/1433* (2013.01); *B41J 2/162* (2013.01); *B41J 2/1637* (2013.01)

(58) Field of Classification Search
CPC ........ B41J 2/0453; B41J 2/1433; B41J 2/162; B41J 2/1637
See application file for complete search history.

(56) References Cited

U.S. PATENT DOCUMENTS

2005/0099452 A1* 5/2005 Kusunoki ............ B41J 2/04581 347/40
2005/0212854 A1 9/2005 Akahira
2006/0007272 A1 1/2006 Ogata
(Continued)

FOREIGN PATENT DOCUMENTS

| | | | |
|---|---|---|---|
| CN | 1504332 | A | 6/2004 |
| CN | 1700987 | A | 11/2005 |
| CN | 100415522 | C | 9/2008 |
| CN | 102991134 | A | 3/2013 |
| EP | 0911164 | A2 | 4/1999 |
| JP | 1034967 | A | 2/1998 |

(Continued)

OTHER PUBLICATIONS

Office Action dated Jul. 16, 2025 issued in CN Appl. No. 202280037683.0; pp. 1-18.

(Continued)

*Primary Examiner* — Jason S Uhlenhake
(74) *Attorney, Agent, or Firm* — Quarles & Brady LLP

(57) ABSTRACT

A nozzle head includes a plate portion arranged in a plate shape, a droplet discharging nozzle portion located in the plate portion, the droplet discharging nozzle portion including a plurality of droplet discharging nozzles ejecting droplets by an electrostatic discharging method, and a pseudo-nozzle portion located around the droplet discharging nozzle portion in the plate portion and including a plurality of pseudo-nozzles. In the nozzle head described above, the plurality of droplet discharging nozzles may be arranged in line in a first direction, and the pseudo-nozzle portion may be arranged on both sides of the droplet discharging nozzle portion.

9 Claims, 18 Drawing Sheets

(56) References Cited

U.S. PATENT DOCUMENTS

| | | | | |
|---|---|---|---|---|
| 2006/0017782 A1 | 1/2006 | Nishi | | |
| 2006/0127814 A1 | 6/2006 | Sexton | | |
| 2009/0303272 A1 | 12/2009 | Jung | | |
| 2013/0063529 A1 | 3/2013 | Hong et al. | | |
| 2014/0034280 A1 | 2/2014 | Lin | | |
| 2015/0372286 A1 | 12/2015 | Bolandi et al. | | |
| 2018/0304629 A1* | 10/2018 | Ogawa | ..................... | B41J 2/145 |

FOREIGN PATENT DOCUMENTS

| | | | | | |
|---|---|---|---|---|---|
| JP | H1034967 A | | 2/1998 | | |
| JP | H10315476 A | | 12/1998 | | |
| JP | 2000127409 A | | 5/2000 | | |
| JP | 2007253373 A | | 10/2007 | | |
| JP | 2015030881 A | | 2/2015 | | |
| JP | 2016517139 | | 6/2016 | | |
| JP | 2018183881 A | | 11/2018 | | |
| KR | 20120104876 A | | 9/2012 | | |
| KR | 20150004133 A | * | 1/2015 | .............. | B41J 2/085 |
| WO | 2004028815 A2 | | 4/2004 | | |

OTHER PUBLICATIONS

International Search Report of PCT/JP2022/013972, filed Mar. 24, 2022, with English translation (5 pages).

Written Opinion of PCT/JP2022/013972, filed Mar. 24, 2022 (4 pages).

ISR (PCT/ISA/210) dated May 31, 2022 issued in PCT/JP2022/013972.

WO-ISA (PCT/ISA/237) dated May 31, 2022 issued in PCT/JP2022/013972.

Office Action dated Aug. 19, 2025 issued in Japanese Application No. 2021-102675.

Office Action dated Sep. 8, 2025 issued in Taiwan Application No. 111122155.

Office Action dated Apr. 8, 2025 issued in JP Application No. 2021-102675 (8 pages).

Korean Office Action, dated May 20, 2025, issued in KR Appl. No. 10-2023-7038970, 9 pages.

Extended European Search Report, dated Jun. 5, 2025, issued in EP Appl. No. 22828005.3, 12 pages.

Office Action dated May 4, 2026 issued in Israel Appl. No. 309312 (4 pages).

The State Intellectual Property Office of People's Republic of China, Second Office Action, Application No. 202280037683.0, Dec. 9, 2025, 20 pages.

Office Action dated Mar. 26, 2026 issued in Taiwan Application No. 111122155, (17 pages).

The Ministry of Intellectual Property—Korean, Notice of Rejection, Application No. 10-2023-7038970, Jan. 29, 2026, 7 pages.

* cited by examiner

NOZZLE HEAD, MANUFACTURING METHOD OF NOZZLE HEAD, AND DROPLET DISCHARGING DEVICE

CROSS-REFERENCE TO RELATED APPLICATIONS

This application is a Continuation of International Patent Application No. PCT/JP2022/013972, filed on Mar. 24, 2022, which claims the benefit of priority to Japanese Patent Application No. 2021-102675, filed on Jun. 21, 2021 the entire contents of which are incorporated herein by reference.

FIELD

The present disclosure relates to a nozzle head, a manufacturing method of the nozzle head, and a droplet discharging device.

BACKGROUND

In recent years, the application of ink jet printing technology to industrial processes has been carried out. A color filter manufacturing process for a liquid crystal display is an example. Conventionally, although a so-called piezo type head that ejects liquid droplets by mechanical pressure or vibration has been widely used as an ink jet printing technique, an electrostatic discharging type ink jet head that can eject finer liquid droplets has attracted attention. Japanese Laid-Open Patent Publication No. H10-34967 discloses an electrostatic discharging type inkjet recording device.

SUMMARY

According to an embodiment of the present disclosure, a nozzle head is provided including: a plate portion having a through hole; a droplet discharging nozzle portion located corresponding to the through hole in the plate portion, the droplet discharging nozzle portion including a plurality of droplet discharging nozzles discharging droplets by an electrostatic discharging method; and a pseudo-nozzle portion located around the droplet discharging nozzle portion in the plate portion and including a plurality of pseudo-nozzles whose tips are blocked.

In the nozzle head described above, the plurality of droplet discharging nozzles may be arranged in line in a first direction, and the pseudo-nozzle portion may be arranged on both sides of the droplet discharging nozzle portion in the first direction.

In the nozzle head described above, the plurality of pseudo-nozzles may be arranged over the entire range of 1 mm or more and 5 mm or less toward the first direction from the outermost pseudo-nozzle.

In the nozzle head described above, the pseudo-nozzle portion may include five or more pseudo-nozzles on both sides of the droplet discharging nozzle portion in the first direction.

In the nozzle head described above, a first distance between adjacent droplet discharging nozzles may be the same as a second distance between adjacent pseudo-nozzles.

In the nozzle head described above, the plurality of droplet discharging nozzles may be arranged in the first direction and in a second direction intersecting the first direction, and the pseudo-nozzle portion may be arranged so as to surround the droplet discharging nozzle portion.

In the nozzle head described above, the pseudo-nozzles may be arranged in line on both sides in the first direction and on both sides in the second direction corresponding to each of the droplet discharging nozzles arranged outside of the plurality of droplet discharging nozzles, and the number of the pseudo-nozzles per row arranged on one side in the first direction and on one side in the second direction is 2 or more and 30 or less.

In the nozzle head described above, the pseudo-nozzle may have a frame shape.

In the nozzle head described above, a first height from the plate portion to the tip of the pseudo nozzle is lower than a second height from the plate portion to the tip of the droplet discharging nozzle.

According to an embodiment of the present disclosure, a droplet discharging device is provided including the nozzle head.

According to an embodiment of the present disclosure, a method for manufacturing a nozzle head is provided including: preparing a mother mold having a first recess group having a plurality of first recesses on a first surface side and a second recess group having a plurality of second recesses arranged around the first recess group, forming a plurality of first structures with an open end in the first recess, forming a plurality of second structures with a closed end in the second recess, and forming a planar third structure in the first surface; forming a resist mask to shield the plurality of first structures and the plurality of second structures; forming a fourth structure on the third structure; and removing the resist mask and releasing the first structure, the second structure, the third structure and the fourth structure from the mother mold, forming a droplet discharging nozzle from the first structure, forming a pseudo nozzle from the second structure, and forming a plate portion from the third structure and the fourth structure.

In the nozzle head described above, an insulating layer may be exposed at a bottom portion of the first recess.

In the nozzle head described above, the plurality of droplet discharging nozzles may be formed in line in the first direction, and the plurality of pseudo-nozzles may be formed on both sides in the first direction relative to the droplet discharging nozzles.

In the nozzle head described above, the plurality of pseudo-nozzles may be formed over the entire range of 1 mm to 5 mm toward the first direction from the outermost pseudo-nozzle.

In the nozzle head described above, five or more pseudo-nozzles may be formed on both sides of the droplet discharging nozzle.

In the nozzle head described above, a first distance between adjacent droplet discharging nozzles may be the same as a second distance between adjacent pseudo-nozzles.

In the nozzle head described above, the plurality of droplet discharging nozzles may be formed in line in a first direction and in a second direction intersecting the first direction, and the pseudo-nozzle may be formed to surround the droplet discharging nozzle.

In the nozzle head described above, the pseudo-nozzles may be formed in line on both sides in the first direction and on both sides in the second direction corresponding to each of the droplet discharging nozzles formed on the outside among the plurality of droplet discharging nozzles, and the number of the pseudo-nozzles per row formed on one side in the first direction and on one side in the second direction is 2 or more and 30 or less.

In the nozzle head described above, the pseudo-nozzle may have a frame shape.

By using an embodiment of the present disclosure, it is possible to provide a multi-nozzle having high discharging uniformity and a droplet discharging device having multi-nozzles.

DESCRIPTION OF EMBODIMENTS

Figure 1:
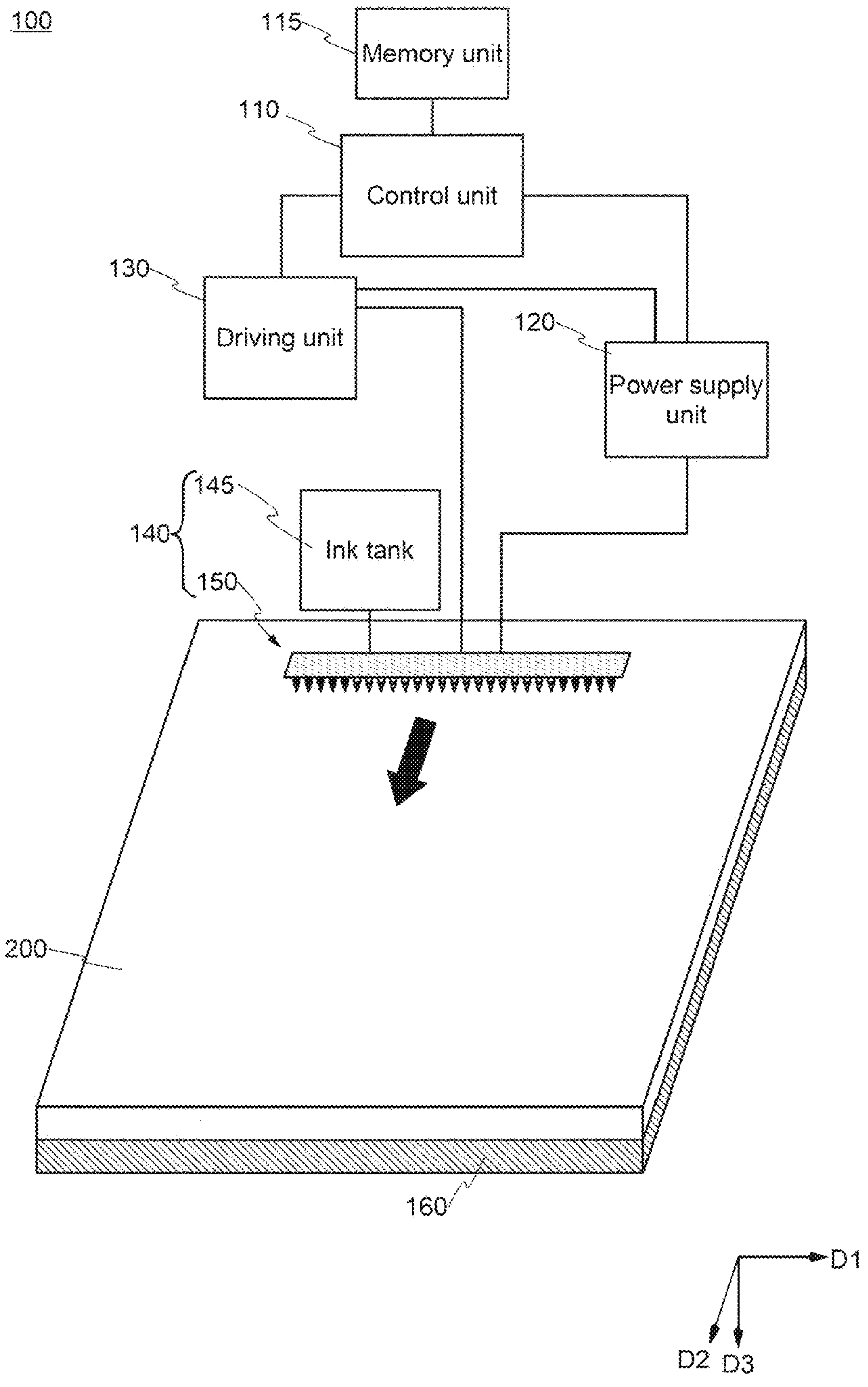
FIG. 1 is a schematic view of a droplet discharging device according to an embodiment of the present disclosure.

Hereinafter, each of the embodiments of the disclosure disclosed in the present application will be described with reference to the drawings. However, the present disclosure can be implemented in various forms without departing from the gist thereof, and is not to be construed as being limited to the description of the embodiments exemplified below.

In addition, in the drawings referred to in the present embodiment, the same or similar parts are denoted by the same reference symbols or similar reference symbols (only denoted by A, B, −1, −2, or the like after the numerals), and repeated description thereof may be omitted. In addition, the dimensional ratios in the drawings may be different from actual ratios for convenience of explanation, or a part of a configuration may be omitted from the drawings.

Furthermore, in the detailed description of the present disclosure, in the case of defining a positional relationship between one component and another component, "on", "above", "under" and "below" include not only the case where the component is located directly above or directly below, but also the case where another component is interposed therebetween unless otherwise specified.

In recent years, from the viewpoint of improving productivity, a multi-nozzle has been developed for an electrostatic discharging type inkjet head. However, in the case of the multi-nozzle, there is a possibility that each nozzle diameter becomes non-uniform. In the case where the diameter of each nozzle is non-uniform, droplets cannot be uniformly ejected to an object. As a result, it is difficult to form a uniform image.

Therefore, an object of the present disclosure is to provide a multi-nozzle having high discharging uniformity and a droplet discharging device having the multi-nozzle.

First Embodiment

[1-1. Configuration of Droplet Discharging Device 100]

FIG. 1 is a schematic diagram of a droplet discharging device 100 according to an embodiment of the present disclosure.

The droplet discharging device 100 includes a control unit 110, a memory unit 115, a power supply unit 120, a driving unit 130, a droplet discharging unit 140, and an object holding unit 160.

The control unit 110 includes a CPU (Central Processing Unit), an ASIC (Application Specific Integrated Circuit), a FPGA (Field Programmable Gate Array), or another arithmetic processor. The control unit 110 controls a discharging process of the droplet discharging unit 140 using a droplet discharging program set in advance.

The memory unit 115 has a function as a database for storing the droplet discharging program and various kinds of information used in the droplet discharging program. As the memory unit 115, memories, SSD, or memory capable elements are used.

The power supply unit 120 is connected to the control unit 110, the driving unit 130, and the droplet discharging unit 140. The power supply unit 120 applies a voltage to the droplet discharging unit 140 based on a signal input from the control unit 110. In this example, the power supply unit 120 applies a pulsed voltage (in this example, 1000 V) to the droplet discharging unit 140. In addition, the voltage is not limited to the pulse voltage, and a constant voltage may be constantly applied. A liquid held in an ink tank 145 by a voltage applied from the power supply unit 120 to a nozzle head 150 is ejected as liquid droplets from a tip 153*a* (see FIG. 2B) of a liquid droplet discharging nozzle 153 (described later) of the nozzle head 150 in a direction (third direction D3) of an object 200.

The driving unit 130 includes a drive member such as a motor, a belt, and a gear. The driving unit 130 moves the droplet discharging unit 140 (more specifically, the nozzle head 150 to be described later) relative to the object holding unit 160 in one direction (in this embodiment, a second direction D2) based on an instruction from the control unit 110. The driving unit 130 may fix the droplet discharging unit 140 and move the object. Further, the driving unit 130 may be used in combination with a goniometer stage, and a position of the nozzle head 150 may be finely adjusted.

The droplet discharging unit 140 includes the ink tank 145 and the nozzle head 150. An electrostatic discharging type inkjet nozzle is used as the nozzle head 150. Details of the nozzle head 150 will be described later. The nozzle head 150 is fixed to a mount and an attachment (not shown). The mount and the attachment may have a groove (elongated hole) for temporarily storing ink supplied from the ink tank 145 in a portion corresponding to the droplet discharging nozzle 153.

The object holding unit 160 has a function of holding the object 200. In this example, a stage is used as the object holding unit 160. A mechanism by which the object holding unit 160 holds the object 200 is not particularly limited, and a general holding mechanism is used. In this example, the object 200 is vacuum-attracted to the object holding unit 160. The object holding unit 160 may hold the object 200 using a fixture.

[1-2. Configuration of Nozzle Head 150]

Figure 2A:
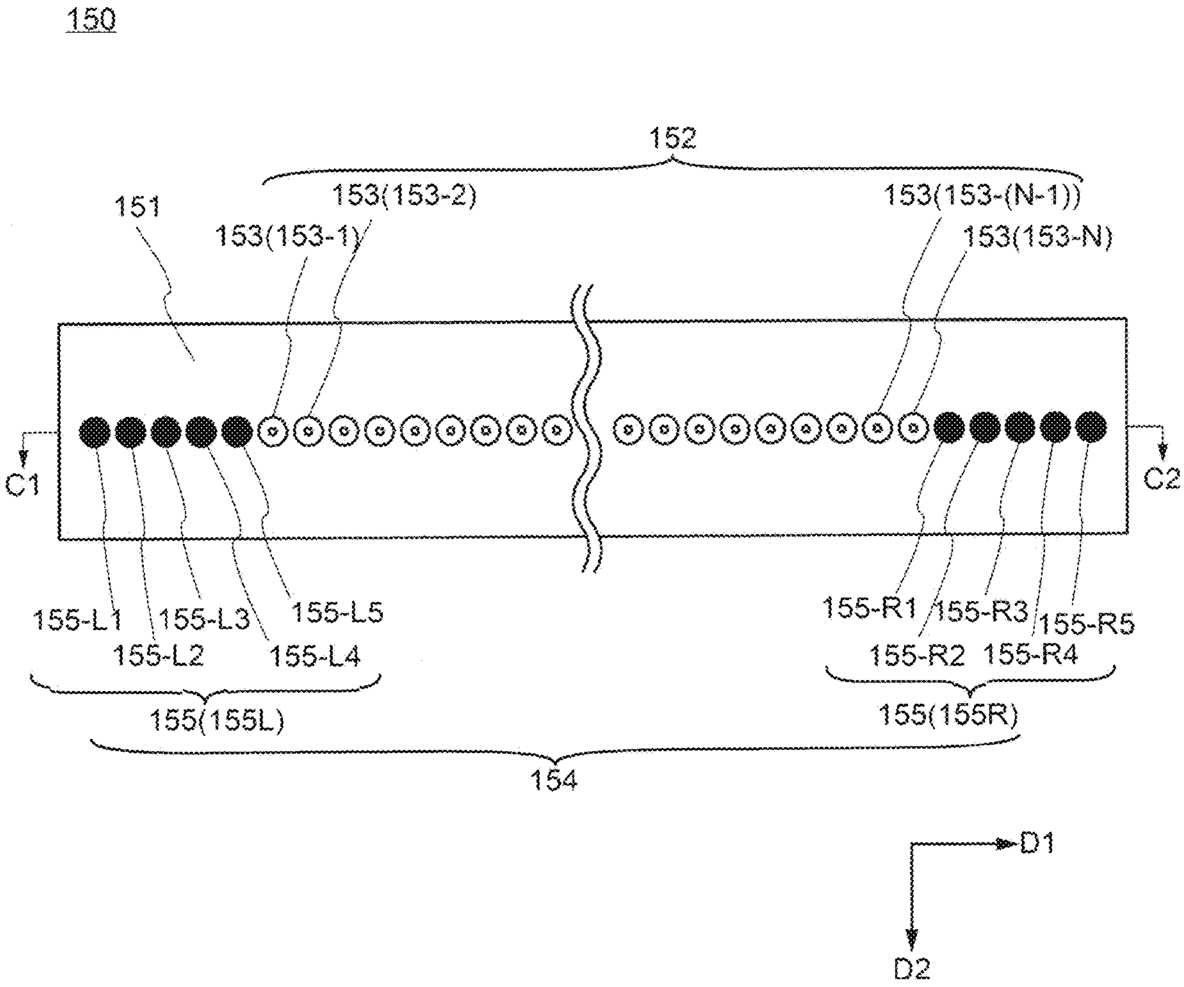
FIG. 2A is a plan view of a nozzle head according to an embodiment of the present disclosure.
Figure 2B:
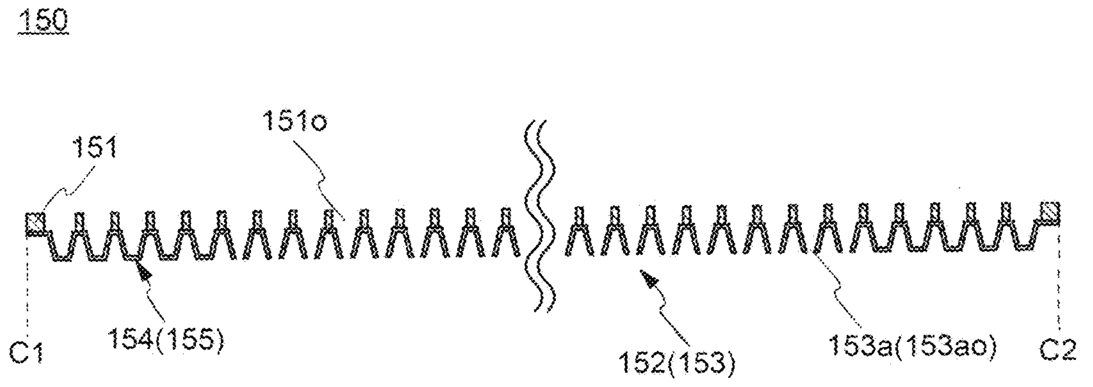
FIG. 2B is a plan view and a cross-sectional view of a nozzle head according to an embodiment of the present disclosure.
Figure 3:
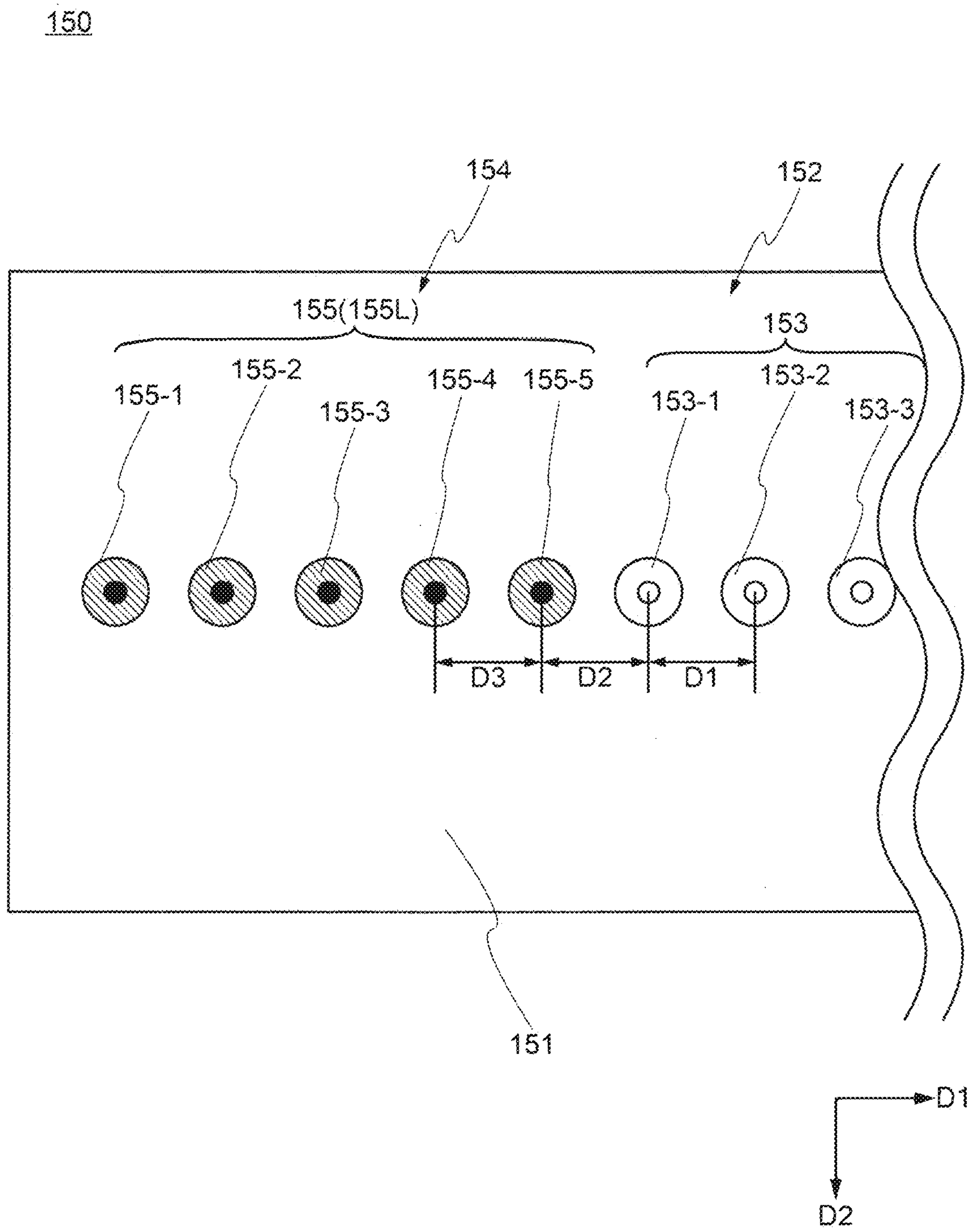
FIG. 3 is an enlarged view of a plan view of a nozzle head according to an embodiment of the present disclosure.
Figure 4:
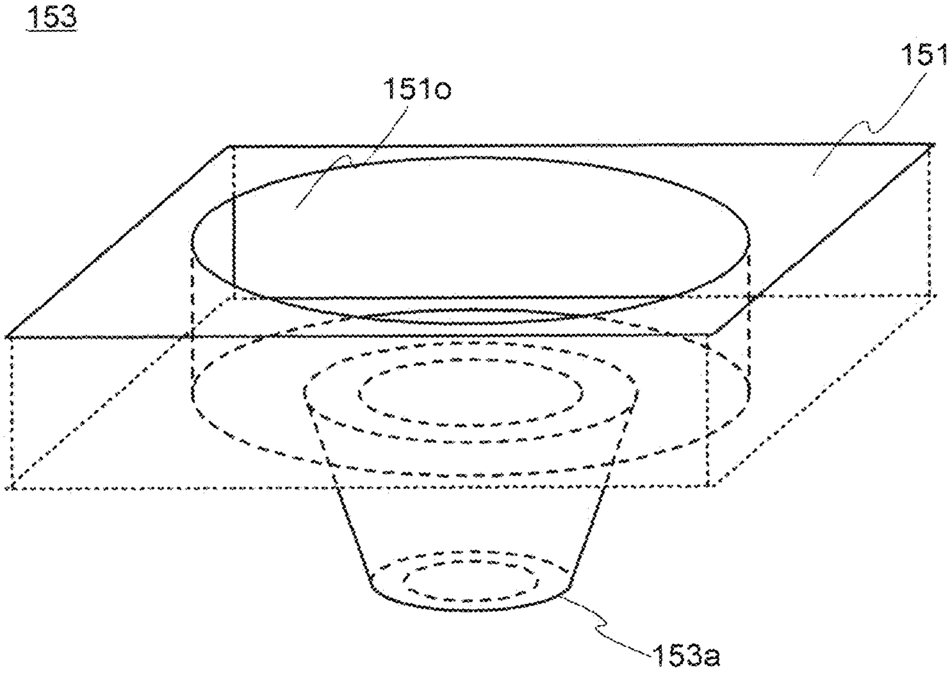
FIG. 4 is a perspective view of a droplet discharging nozzle according to an embodiment of the present disclosure.
Figure 5A:
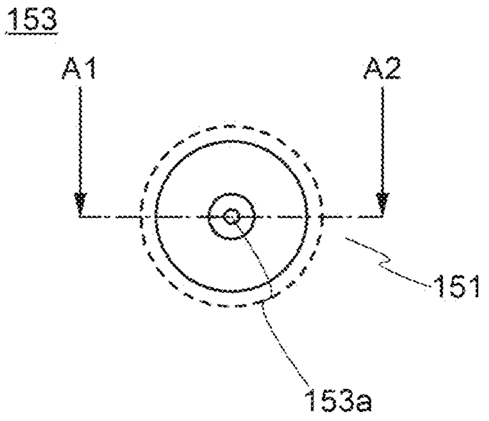
FIG. 5A is a top view of a droplet discharging nozzle according to an embodiment of the present disclosure.
Figure 5B:
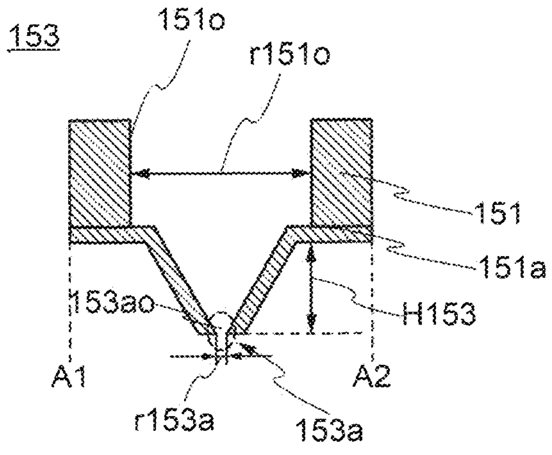
FIG. 5B is a cross-sectional view of a droplet discharging nozzle according to an embodiment of the present disclosure.
Figure 6:
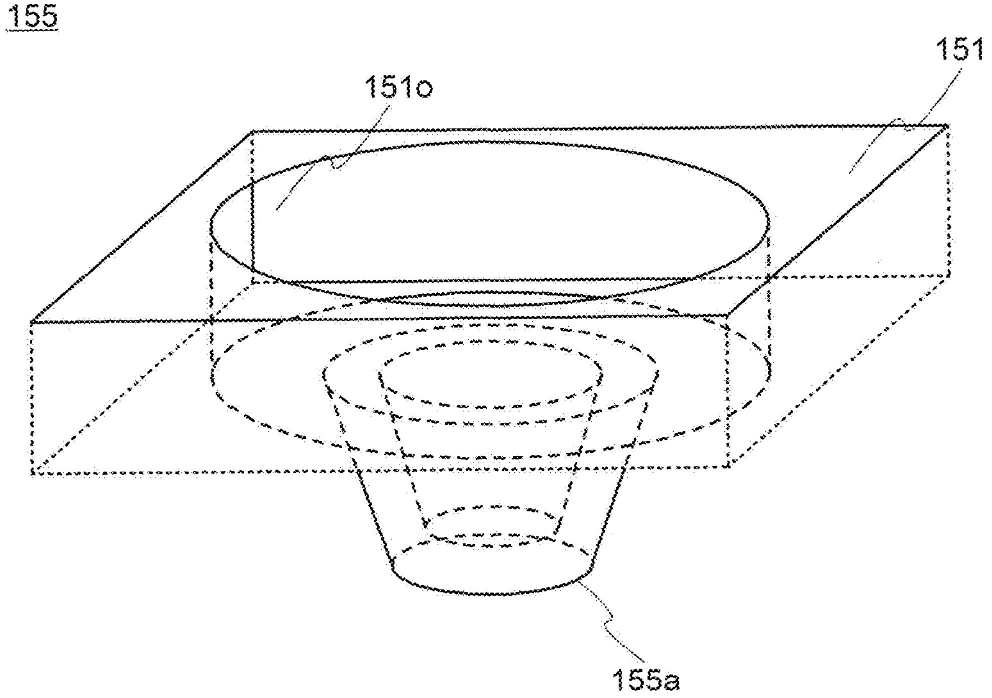
FIG. 6 is a perspective view of a pseudo-nozzle according to an embodiment of the present disclosure.
Figure 7A:
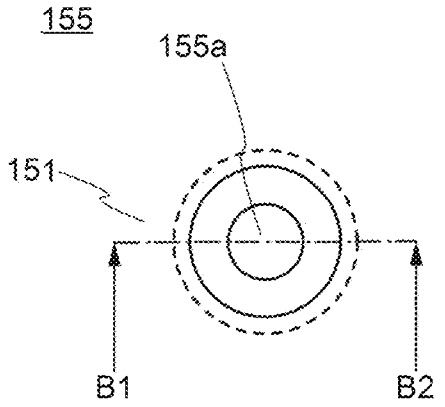
FIG. 7A is a top view of a pseudo-nozzle according to an embodiment of the present disclosure.
Figure 7B:
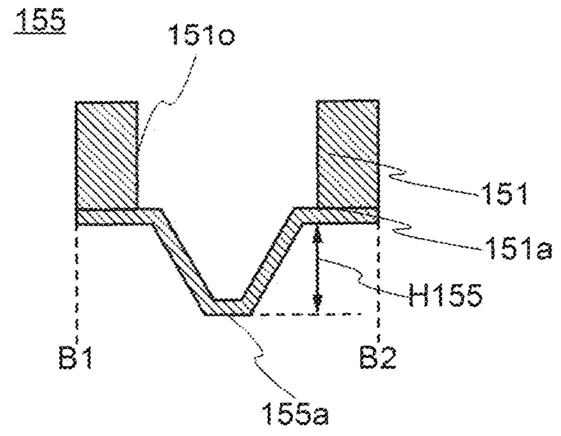
FIG. 7B is a cross-sectional view of a pseudo-nozzle according to an embodiment of the present disclosure.

Hereinafter, a configuration of the nozzle head 150 will be described in detail. FIG. 2A is a plan view of the nozzle head 150. FIG. 2B is a cross-sectional view between C1-C2 of the nozzle head 150. FIG. 3 is an enlarged view of the plan view of the nozzle head 150. FIG. 4 is a perspective view of the droplet discharging nozzle 153. FIG. 5A is a top view of the droplet discharging nozzle 153. FIG. 5B is a cross-sectional view of the droplet discharging nozzles 153 between A1-A2. FIG. 6 is a perspective view of a pseudo-nozzle 155. FIG. 7A is a top view of the pseudo-nozzle 155. FIG. 7B is a cross-sectional view of the pseudo-nozzle 155 between B1-B2.

As shown in FIG. 2A and FIG. 2B the nozzle head 150 includes a plate portion 151, a droplet discharging nozzle portion 152, and a pseudo-nozzle portion 154.

The plate portion 151 is arranged in a plate shape. The plate portion 151 extends in a first direction D1. A metal material such as stainless steel is used for the plate portion 151. A thickness of the plate portion 151 is appropriately set. In this example, the thickness of the plate portion is 10 μm or more and 100 μm or less.

As shown in FIG. 4, FIG. 5A, and FIG. 5B, the droplet discharging nozzle portion 152 is arranged on one surface side of the plate portion 151. The droplet discharging nozzle portion 152 includes a plurality of droplet discharging nozzles 153. The droplet discharging nozzles 153 are arranged in line in a first direction D1 In the present embodiment, the droplet discharging nozzles 153-1, 153-2, . . . , 153-(N−1) and 153-N are arranged in the plate portion 151. N is a natural number of 20 or more. In this example, N=21. In the case where the droplet discharging nozzles 153-1, 153-2, . . . , 153-(N−1) and 153-N need not be separately described, the explanation will be described as the droplet discharging nozzle 153. A metal material such as nickel is used for the droplet discharging nozzle 153. The droplet discharging nozzle 153 has a tapered shape.

The plate portion 151 has a through hole 1510 having an inner diameter r151*o* larger than an inner diameter r153*a* of a discharging port of the droplet discharging nozzle 153 (an opening portion 153*ao* on the tip 153*a* of the droplet discharging nozzle 153) on a portion corresponding to (a portion overlapping) the droplet discharging nozzle 153. An inner diameter of the through hole of the plate portion 151 may be 1 μm or more and 100 μm or less. An inner diameter of the tip 153*a* of the droplet discharging nozzle 153 may be several hundred nm or more and 50 μm or less, preferably 1 μm or more and 30 μm or less, and more preferably 5 μm or more and 20 μm or less. In the present embodiment, a voltage may be applied to the droplet discharging nozzle 153, a voltage may be applied to the plate portion 151 (or the ink tank 145), or a voltage may be applied to the ink. In the case where a voltage is applied to the plate portion 151 and the droplet discharging nozzle 153, an electrode may be arranged. The electrode may be arranged with tungsten, nickel, molybdenum, titanium, gold, silver, copper, platinum, or the like. In this case, a plurality of electrodes may be arranged so that a voltage is uniformly applied to the entire plate portion 151. Further, in the present embodiment, although an example in which a voltage is applied to the droplet discharging nozzle 153, the plate portion 151, or the ink has been described, a voltage may be applied to a jig (for example, a mount or an attachment) that holds the nozzle head 150.

As shown in FIGS. 2A and 2B, the pseudo-nozzle portion 154 is arranged on the same surface of the plate portion 151 as the droplet discharging nozzle portion 152. The pseudo-nozzle portion 154 includes a plurality of pseudo-nozzles 155. The pseudo-nozzle portion 154 is arranged around the droplet discharging nozzle portion 152. In this embodiment, the pseudo-nozzle portion 154 is arranged on both sides of the droplet discharging nozzle portion 152 in the first direction D1. Further, the plurality of pseudo-nozzles 155 may be disposed in a predetermined region from the pseudo-nozzle 155 disposed on the outermost side (the pseudo-nozzle 155-1). From the viewpoint of electric field strength in a peripheral portion, the plurality of pseudo-nozzles 155 may be arranged over the entire range of 1 mm or more and 5 mm or less (preferably 2 mm) from the pseudo-nozzle 155 disposed on the outermost side toward the first direction D1. In this case, a number of the pseudo-nozzles 155 arranged on one side of the droplet discharging nozzle portion 152 in the first direction D1 may be ⅕ or more of a number of the droplet discharging nozzles 153. For example, the number of the pseudo-nozzles 155 arranged on one side of the droplet discharging nozzle portion 152 in the first direction D1 may be 5 or more and 50 or less, preferably 10 or more and 30 or less. In the present embodiment, a left pseudo-nozzle 155L including five pseudo-nozzles 155 (pseudo-nozzles 155-L1 to 155-L5) is arranged on the left side of the droplet discharging nozzle portion 152 including the twenty-one droplet discharging nozzles 153. Similarly, a right pseudo-nozzle 155R including five pseudo-nozzles 155 (pseudo-nozzles 155-R1 to 155-R5) is arranged on the right side of the droplet discharging nozzle portion 152. In addition, in the case where a description does not need to be divided as in the case of the pseudo-nozzles 155-L1 to 155-L5, the description is given as the pseudo-nozzle 155.

As shown in FIG. 3, a distance D1 between adjacent droplet discharging nozzles (a distance between the droplet discharging nozzle 153-1 and the droplet discharging nozzle 153-2), a distance D2 between the adjacent droplet discharging nozzle 153 and the pseudo-nozzle 155 (a distance between the droplet discharging nozzle 153-1 and the pseudo-nozzle 155-L5), and a distance D3 between the adjacent pseudo-nozzles 155 (a distance between the pseudo-nozzle 155-L4 and the pseudo-nozzle 155-L5) are the same. In this case, the distance D1, D2, and D3 between the nozzles is 200 micrometers.

As shown in FIG. 6 and FIG. 7B, a tip 155*a* of the pseudo-nozzle 155 does not have an opening and is closed. Therefore, the pseudo-nozzle 155 does not eject droplets. A material similar to that of the droplet discharging nozzle 153 is used for the pseudo-nozzle 155. The pseudo-nozzle 155 may have a shape similar to that of the droplet discharging nozzle 153. In this case, a height H155 (Also referred to as a first height. Specifically, a height from an upper surface 151*a* of the plate portion 151 to the tip 155*a* of the pseudo-nozzle 155) of the pseudo-nozzle 155 may be the same as a height H153 (Also referred to as a second height. Specifically, a height from the upper surface 151*a* of the plate portion 151 to the tip 153*a* of the droplet discharging nozzle 153) of the droplet discharging nozzle 153.

Here, in the case where droplets are ejected by an electrostatic discharging method using a nozzle head including a plurality of nozzles, an electric field may be larger in a peripheral region of the plate than in a center of the plate. In the case of the nozzle head 150 of the present embodiment, the pseudo-nozzle portion 154 is disposed around the droplet discharging nozzle portion 152. That is, the plurality of pseudo-nozzles 155 are arranged in the region where the electric field increases. Since the tips of the plurality of pseudo-nozzles 155 are blocked, no droplets are ejected. On the other hand, the electric field in a region where the droplet discharging nozzle 153 is disposed becomes uniform. This makes it possible to make the sizes of the droplets ejected from the respective droplet discharging nozzles 153 uniform.

[1-3. Manufacturing Method of Nozzle Head 150]

A manufacturing method of the nozzle head 150 will be described with reference to the drawings. FIG. 8A to FIG. 8D and FIG. 9A to FIG. 9C are cross-sectional views showing a manufacturing flow of the nozzle head.

Figure 8A:
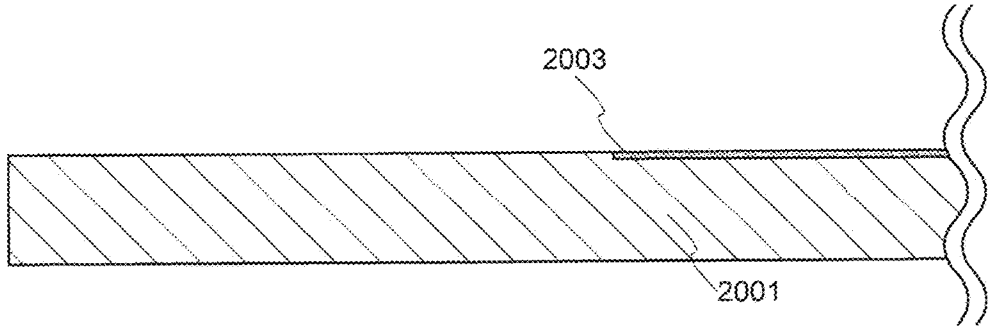
FIGS. 8A, 8B, 8C, and 8D are a manufacturing flow diagram of a nozzle head according to an embodiment of the present disclosure.
Figure 8B:
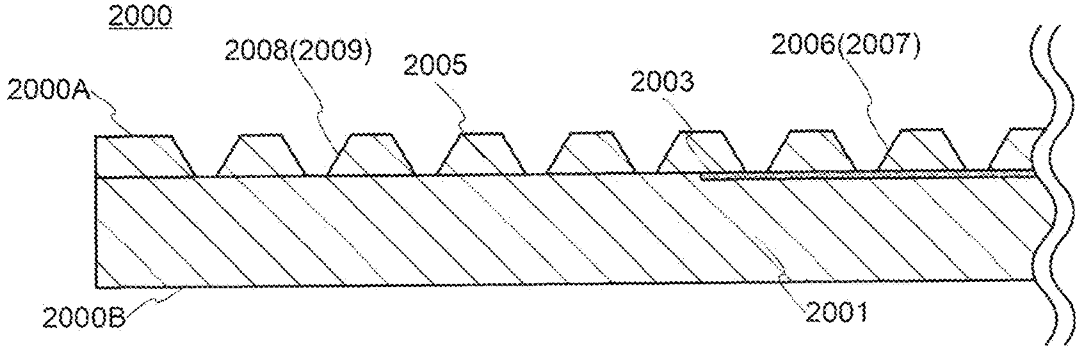

First, as shown in FIG. 8B, a mother mold 2000 for forming the droplet discharging nozzle 153 and the pseudo-nozzle 155 is prepared. In the present embodiment, the concave shaped mold 2000 has a first surface 2000A and a second surface 2000B opposite to the first surface 2000A. The mother mold 2000 includes a first mother mold 2001 and a second mother mold 2005. Further, a first recess group 2006 having a plurality of first recesses 2007 for forming a droplet discharging nozzle and a second recess group 2008 arranged around the first recess group 2006 and having a plurality of second recesses 2009 for forming a pseudo-nozzle are arranged on the first surface 2000A.

The mother mold 2000 is formed by performing a film forming process, a photolithography process, and an etching process. Specifically, the first mother mold 2001 arranged in a plate shape is prepared. The first mother mold 2001 may be a metal base material, or may be an insulating base material or a semiconductor base material having a conductive film formed thereon. As shown in FIG. 8A, an insulating layer 2003 is formed in a portion of an upper surface of the first mother mold 2001 where the droplet discharging nozzle 153 is formed. Next, as shown in FIG. 8B, the second mother mold 2005 made of a metal material is formed on the first mother mold 2001. The second mother mold 2005 may be formed by forming a metal layer and then processing the metal layer by a photolithography method, an etching method, or the like. In this case, the insulating layer 2003 is exposed at a bottom portion of the first recess 2007. The first mother mold 2001 is exposed at a bottom portion of the second recess 2009.

Although the insulating layer 2003 is formed in a portion where the droplet discharging nozzle 153 is formed, the present disclosure is not limited to this. For example, the insulating layer 2003 may be formed on an entire upper surface of the first mother mold 2001. In this case, a conductive layer or a catalyst layer may be formed in a portion where the insulating layer 2003 is exposed in a region where the pseudo-nozzle 155 is formed. The second mother mold 2005 may be joined to the first mother mold 2001.

Figure 8C:
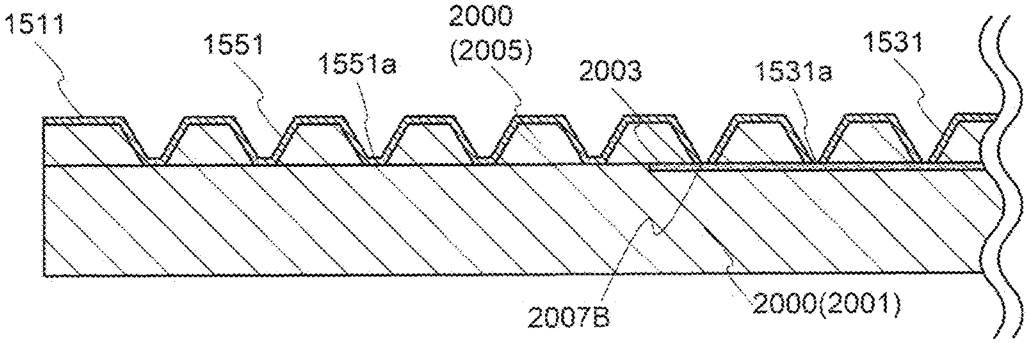

Next, as shown in FIG. 8C, a plurality of structures 1531 (also referred to as first structures) are formed in the first recess 2007 by an electroforming method (plating method), a plurality of structures 1551 (also referred to as second structures) are formed in the second recess 2009, and planar structures 1511 (also referred to as third structures) are formed on the first surface 2000A. The structure 1531, the structure 1551, and the structure 1511 are formed at the same timing. The structure 1551 is formed around the structure 1531. In this example, they are formed on either side of the group of structures 1531.

In this case, as shown in FIG. 8B, the insulating layers 2003 are exposed on a bottom portion 2007B of the first recesses 2007. Therefore, the presence of the insulating layer 2003 at a tip of the structure 1531 prevents an electrolytic casting process. Therefore, a tip 1531*a* of the structure 1531 is opened. As a result, the droplet discharging nozzle 153 having the hole opening portion 153*ao* is formed on the tip 153*a*. On the other hand, since the upper surface of the first mother mold 2001 is exposed (a catalyst layer or a conductive film is present) at a tip of the structure 1551, an electrolytic casting process is performed. Therefore, the tip of the structure 1551 is blocked. Thus, the pseudo-nozzle 155 is formed.

Figure 8D:
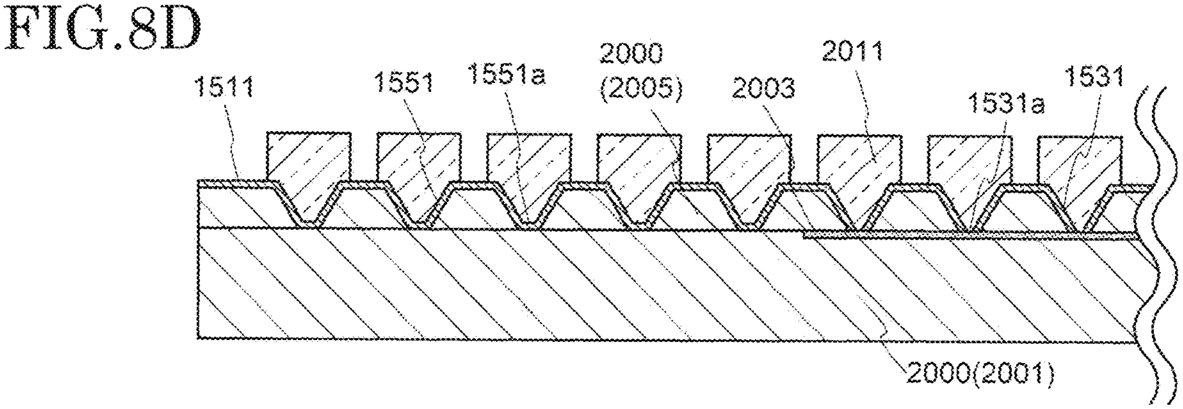
Figure 9A:
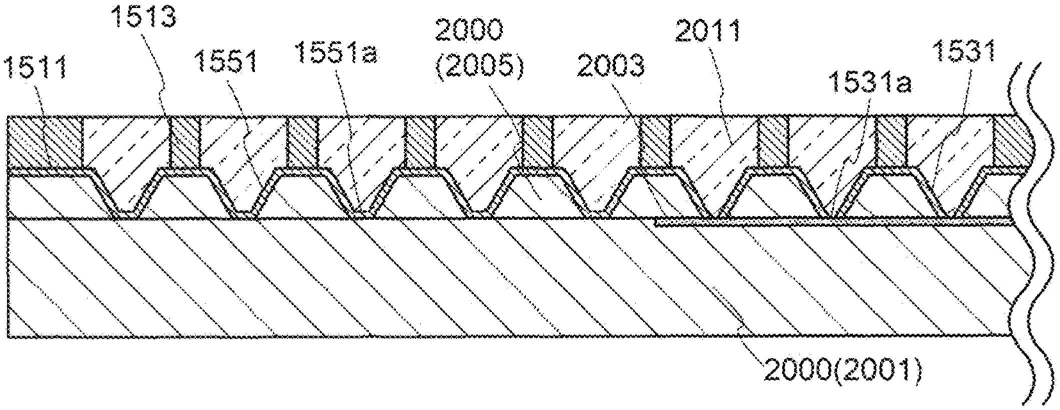
FIGS. 9A, 9B, and 9C are a manufacturing flow diagram of a nozzle head according to an embodiment of the present disclosure.
Figure 9B:
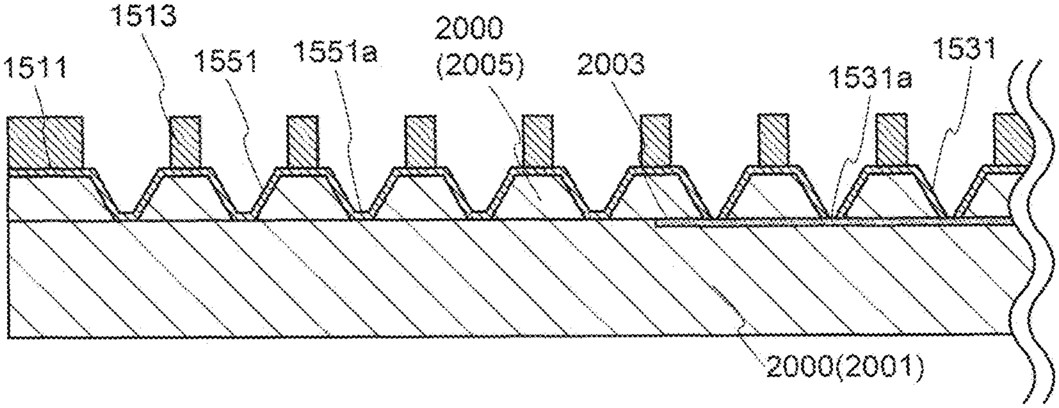

Next, as shown in FIG. 8D, a resist mask 2011 is formed at a portion corresponding to the tip 153*a* of the droplet discharging nozzle 153 (specifically, the tip 1531*a*) and a portion corresponding to the tip 155*a* of the pseudo-nozzle 155 (specifically, the tip 1551*a*), Next, as shown in FIG. 9A, the structure 1513 is formed by electrolytic casting on an exposed portion of the structure 1511. After the structure 1513 is formed, the resist mask 2011 is removed (FIG. 9B).

Figure 9C:
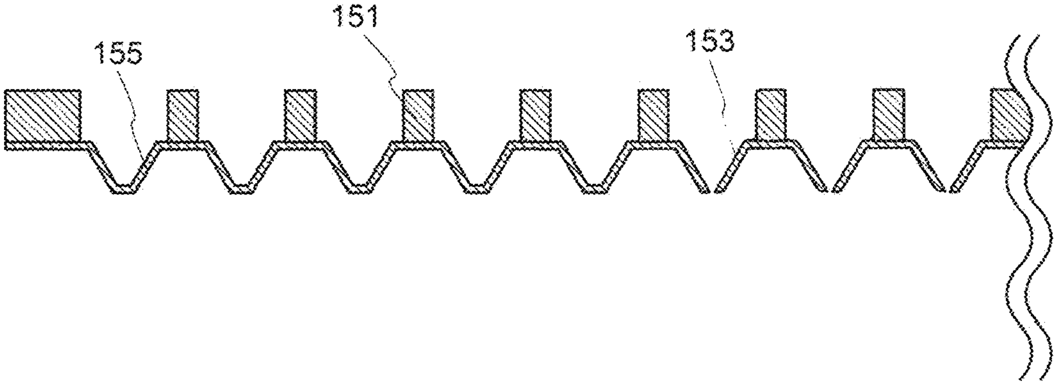

Finally, as shown in FIG. 9C, the structure 1511, the structure 1513, the structure 1531 and the structure 1551 are removed (released) from the mother mold 2000. As a result, the plate portion 151 is formed by the structure 1511 and the structure 1513. The droplet discharging nozzle 153 is formed by the structure 1531. The pseudo-nozzle 155 is formed by the structure 1551. As described above, the nozzle head 150 can be manufactured.

In the above description, in the case where the structure is formed on the mother mold 2000 by the electroforming method, a region at the end of the mother mold 2000 tends to have a non-uniform electric field. However, in the present embodiment, the region at the end of the mother mold 2000 is a region in which a pseudo-nozzle is formed, Therefore, the electric field in the region where the droplet discharging nozzle 153 is formed becomes uniform. As a result, a shape of the droplet discharging nozzle 153 and an opening shape of the tip 153*a* can be made uniform.

Therefore, by using the present embodiment, the shape of the plurality of droplet discharging nozzles becomes uniform. Therefore, it is possible to improve the discharging uniformity by the plurality of droplet discharging nozzles.

Second Embodiment

In the present embodiment, a nozzle head 150A that differs from the first embodiment will be described. Specifically, an example in which the pseudo-nozzle portion is arranged so as to surround the droplet discharging nozzle will be described. In addition, due to the relationship of the description, members will be omitted as appropriate.

[2-1. Configuration of Nozzle Head 150A]

Figure 10A:
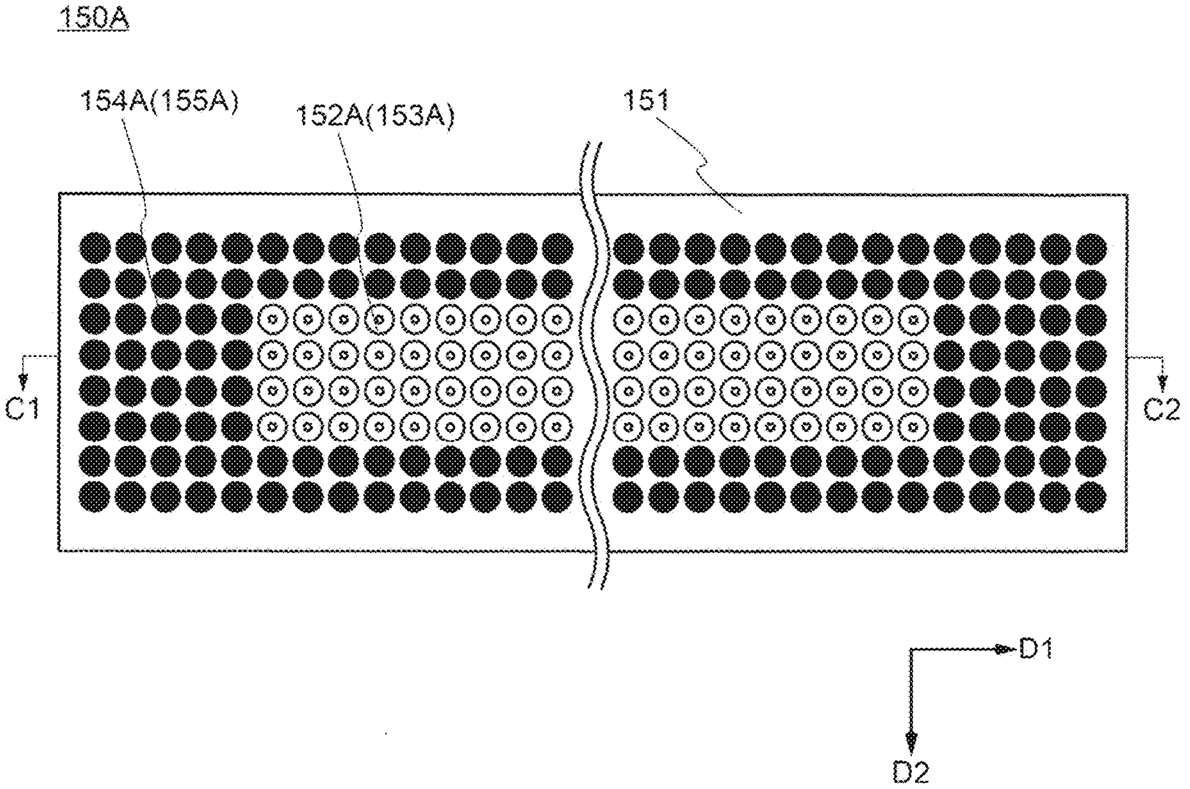
FIG. 10A is a plan view of a nozzle head according to an embodiment of the present disclosure.
Figure 10B:
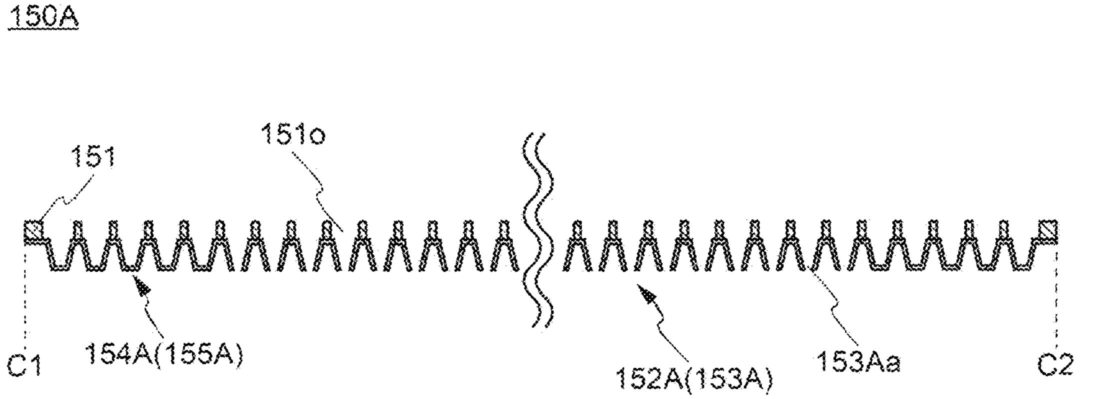
FIG. 10B is a cross-sectional view of a nozzle head according to an embodiment of the present disclosure.

FIG. 10A is a plan view of the nozzle head 150A. FIG. 10B is a cross-sectional view between C1-C2 of the nozzle head 150A. As shown in FIG. 10A and FIG. 10B, the nozzle head 150A includes the plate portion 151, a droplet discharging nozzle portion 152A, and a pseudo-nozzle portion 154A.

The droplet discharging nozzle portion 152A is arranged on one surface of the plate portion 151. The droplet discharging nozzle portion 152A includes a plurality of droplet discharging nozzles 153A. The droplet discharging nozzles 153A are arranged in line in the first direction D1 and the second direction D2 that intersects (in this case, is perpendicular to) the first direction D1. In this embodiment, the droplet discharging nozzle portion 152A includes 4 rows×100 columns=400 droplet discharging nozzles.

As shown in FIG. 10A and FIG. 10B, the pseudo-nozzle portion 154A is arranged on the same surface as the droplet discharging nozzle portion 152A in the plate portion 151. The pseudo-nozzle portion 154A includes a plurality of pseudo-nozzles 155A. The pseudo-nozzle portion 154A is arranged around the droplet discharging nozzle portion 152A. In this embodiment, the pseudo-nozzle portion 154A is arranged so as to surround the droplet discharging nozzle portion 152A. The number of the pseudo-nozzles arranged in each row on both sides (left and right sides) in the first direction D1 and on both sides (upper and lower sides) in the second direction D2 may be 2 or more and 30 or less. Specifically, five rows of pseudo-nozzles 155A are arranged on both left and right sides of the droplet discharging nozzle portion 152A. Further, two rows of pseudo-nozzles 155A are arranged on both upper and lower sides of the droplet discharging nozzle portion 152A. In addition, in the case where the droplet discharging nozzle portion 152A includes 1000 rows×1000 columns=1,000,000 droplet discharging nozzles, 20 rows (columns) of pseudo-nozzles 155A may be arranged on the upper, lower, left, and right sides. In this case, the plurality of pseudo-nozzles 155A may have a spacing (pitch) of 10 μm between the pseudo-nozzles 155 (the pseudo-nozzles 155-1) disposed on the outermost side and the neighboring pseudo-nozzle 155A.

By using the present embodiment, the shape of the plurality of droplet discharging nozzles becomes uniform. Therefore, it is possible to improve the discharging uniformity by the plurality of droplet discharging nozzles.

Third Embodiment

In the present embodiment, a nozzle head different from the first embodiment and the second embodiment will be described. Specifically, an example in which the pseudo-nozzle is arranged in a frame shape will be described. In addition, parts overlapping the first embodiment and the second embodiment will be omitted as appropriate.

[3-1. Configuration of Nozzle Head 150B]

Figure 11A:
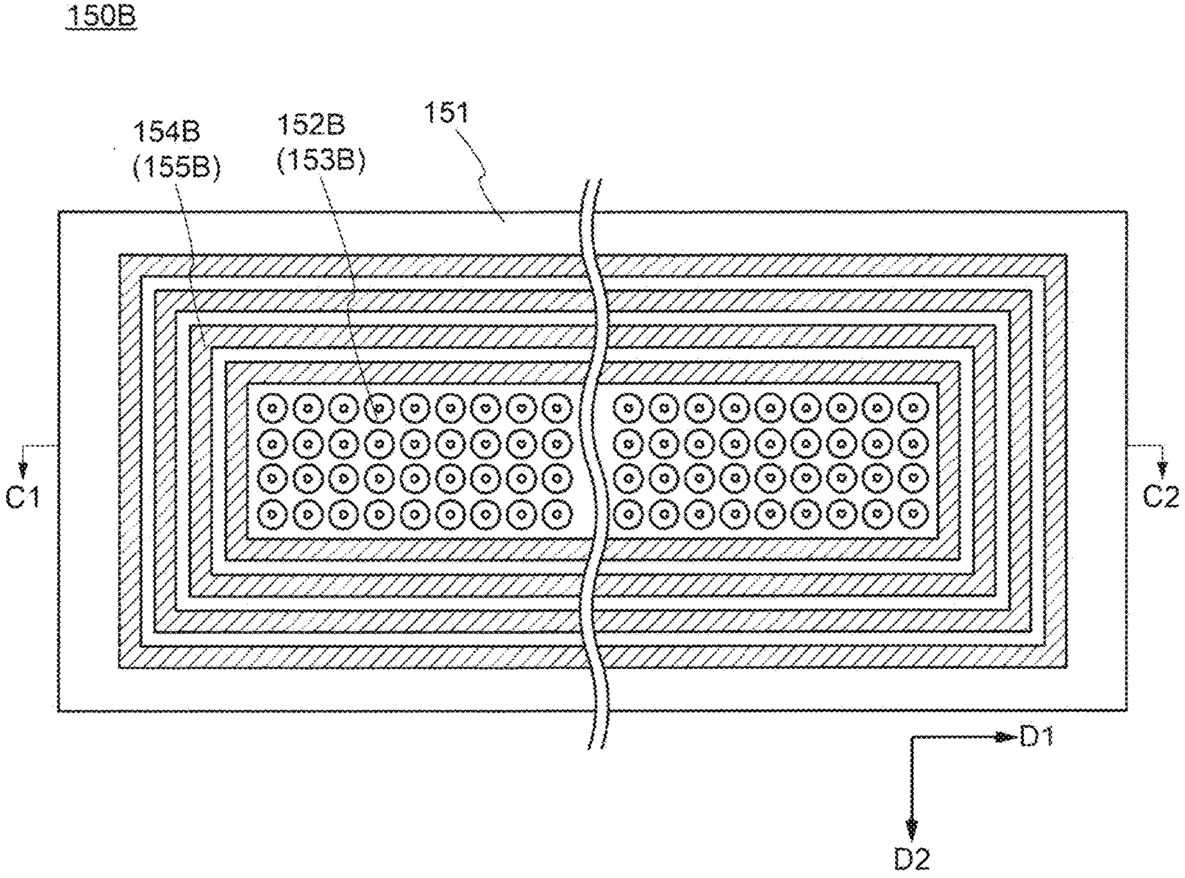
FIG. 11A is a plan view of a nozzle head according to an embodiment of the present disclosure.
Figure 11B:
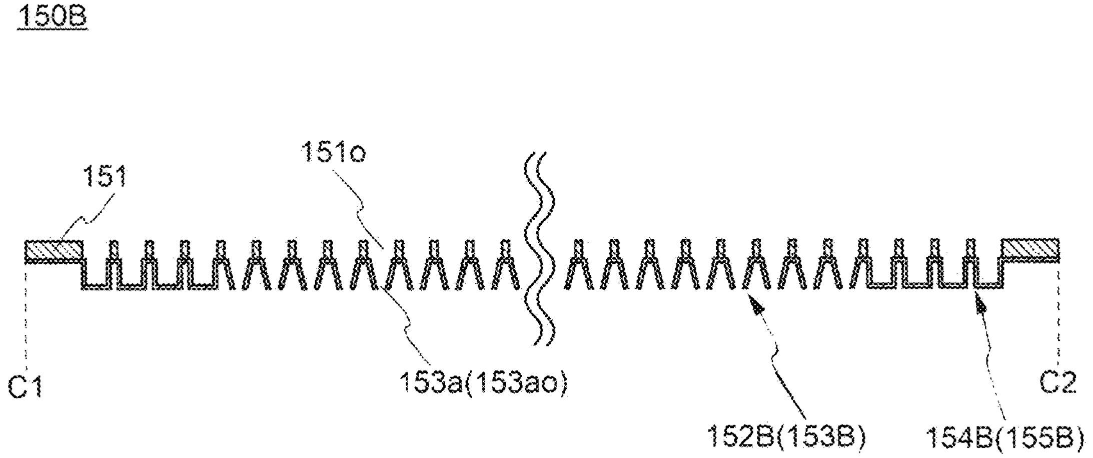
FIG. 11B is a cross-sectional view of a nozzle head according to an embodiment of the present disclosure.

FIG. 11A is a plan view of a nozzle head 150B, FIG. 11B is a schematic cross-sectional view between C1-C2 of the nozzle head 150B. As shown in FIG. 11A and FIG. 11B, the nozzle head 150B includes the plate portion 151, a droplet discharging nozzle portion 152B, and a pseudo-nozzle portion 154B.

The droplet discharging nozzle portion 152B is arranged on one surface of the plate portion 151. The droplet discharging nozzle portion 152B includes a plurality of droplet discharging nozzles 153B. The droplet discharging nozzles 153B are arranged in line in the first direction D1 and the second direction D2 intersecting the first direction D1 In this embodiment, the droplet discharging nozzle portion 152B includes 4 rows×100 columns=400 droplet discharging nozzles.

As shown in FIG. 11A and FIG. 11B, the pseudo-nozzle portion 154B is arranged on the same surface as the droplet discharging nozzle portion 152B in the plate portion 151. The pseudo-nozzle portion 154B includes a plurality of pseudo-nozzles 155B. The pseudo-nozzle portion 154B is arranged around the droplet discharging nozzle portion 152B. In this embodiment, the pseudo-nozzle portion 154B is arranged so as to surround the droplet discharging nozzle portion 152B. Specifically, the pseudo-nozzle 155B having four frame shapes surrounding the droplet discharging nozzle portion 152B is arranged. In this case, as shown in FIG. 11B, the pseudo-nozzle 155B may have a rectangular shape or may have a shape that tapers toward the tip.

By using the present embodiment, the shape of the plurality of droplet discharging nozzles becomes uniform. Therefore, it is possible to improve the discharging uniformity by the plurality of droplet discharging nozzles.

Fourth Embodiment

In the first embodiment of the present disclosure, although the height H155 of the pseudo-nozzle 155 is the same as the height H153 of the droplet discharging nozzle 153, the present disclosure is not limited thereto. In the present embodiment, a nozzle head different from the first embodiment will be described. Specifically, an example in which a height of the droplet discharging nozzle is different from a height of the pseudo-nozzle will be described. In addition, parts overlapping the first embodiment and the second embodiment will be omitted as appropriate.

Figure 12A:
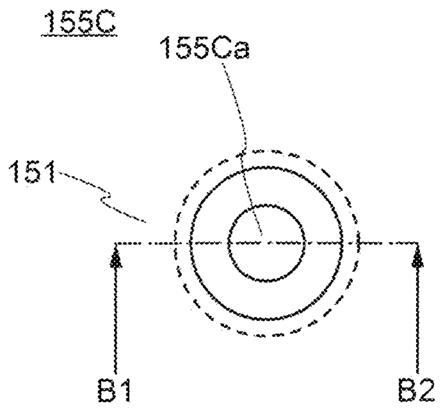
FIG. 12A is a top view of a pseudo-nozzle according to an embodiment of the present disclosure.
Figure 12B:
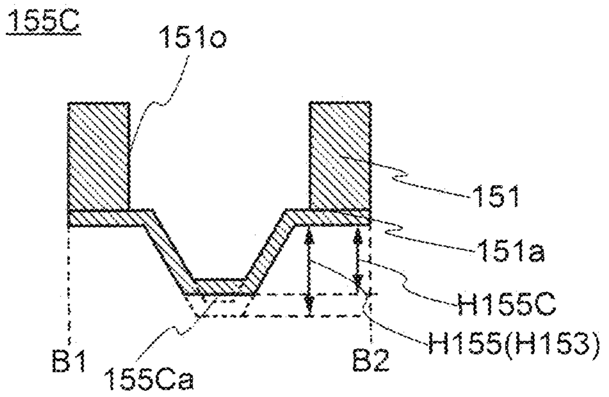
FIG. 12B is a cross-sectional view of a pseudo-nozzle according to an embodiment of the present disclosure.

FIG. 12A is a top view of a pseudo-nozzle 155C. FIG. 12B is a cross-sectional view between B1-B2 in the pseudo-nozzle 1550. A height H155C of the pseudo-nozzle 155C may be lower than the height H153 of the droplet discharging nozzle 153. This prevents the droplet discharging nozzle 153 from becoming an obstacle when ejecting droplets. Therefore, by using an embodiment of the present disclosure, droplets can be stably ejected.

Fifth Embodiment

In the present embodiment, a nozzle head different from the first embodiment will be described. Specifically, an example in which the pseudo-nozzle is filled with a filler will be described. In addition, parts overlapping with the first embodiment and the second embodiment will be omitted as appropriate.

Figure 13A:
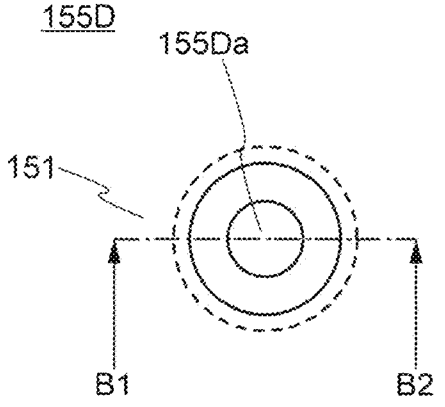
FIG. 13A is a top view of a pseudo-nozzle according to an embodiment of the present disclosure.
Figure 13B:
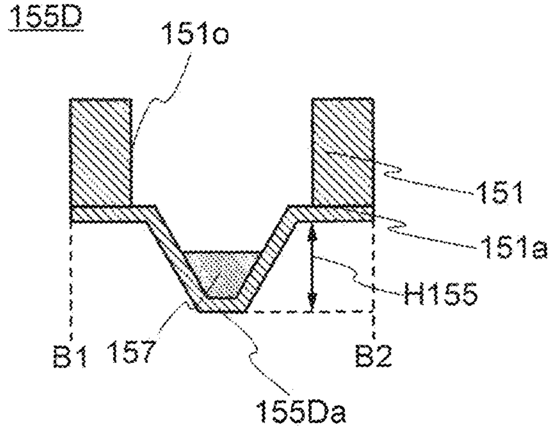
FIG. 13B is a cross-sectional view of a pseudo-nozzle according to an embodiment of the present disclosure.

FIG. 13A is a top view of a pseudo-nozzle 155D. FIG. 13B is a cross-sectional view between B1-B2 in the pseudo-nozzle 155D. The pseudo-nozzle 155D may be filled with a filler 157. The filler 157 may be arranged only at a tip of the pseudo-nozzle 155 or may be filled up to the plate portion 151. In this case, the pseudo-nozzle 155D may be filled with a material other than an ink material. In this example, the pseudo-nozzle 155 is filled with a resin material. In addition to the resin material, a glass material or a ceramic material may be used as the filler 157. Also, depending on the material to be filled, an electric field which is formed may vary. Therefore, from the viewpoint of electric field homogenization, a metal material or a conductive material may be filled. Further, a liquid that does not exert a discharge force by an electric field, for example, a non-polar solvent, a silicone, a hydrocarbon-based solvent, or an ionic liquid may be used for the filler 157. By using the present embodiment, droplets can be stably ejected.

EXAMPLES

Hereinafter, an embodiment of a nozzle head according to an embodiment of the present disclosure will be described.

[1. Configuration of Nozzle Head]

Hereinafter, a nozzle head having a pseudo-nozzle using an embodiment of the present disclosure, and a nozzle head not arranged with a pseudo-nozzle as a comparative example will be described.

Nozzle Head of Example 1

The configuration of the nozzle head of example 1 is as follows,

Droplet discharging nozzle: 21 pieces×1 row

Pseudo-nozzle: 5 pieces on both sides of the droplet discharging nozzle

A nozzle head of the example 1 was formed by an electrolytic casting method and adhered to the mount.

Figure 14:
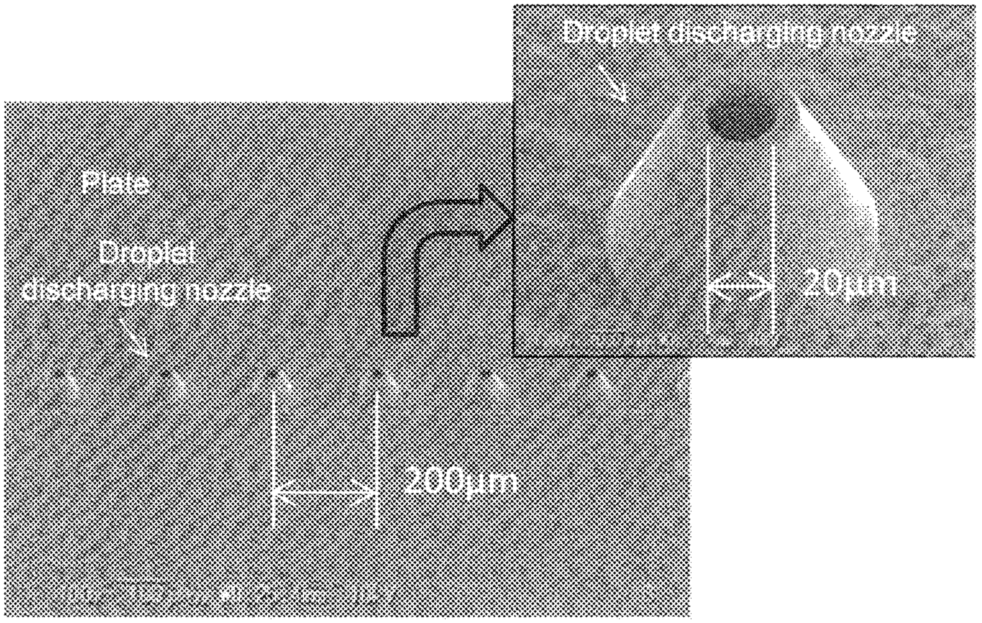
FIG. 14 is an electron micrograph of a droplet discharging nozzle in a nozzle head manufactured using an embodiment of the present disclosure.

FIG. 14 is an electron micrograph of a droplet discharging nozzle. As shown in FIG. 14, droplet discharging nozzles are arranged in a row. A configuration of the droplet discharging nozzle is as follows.

Distance between adjacent droplet discharging nozzles: 200 μm

Height of droplet discharging nozzle: 50 μm

Inner diameter of tip of droplet discharging nozzle: 20 μm

Tilt from bottom portion to tip of droplet discharging nozzle: 20°

Nozzle Head of Comparative Example

A configuration of a nozzle head in a comparative example is as follows.

Droplet discharging nozzle: 100 pieces×1 row

Pseudo-nozzle: None

The nozzle head of the comparative example was formed by an electrolytic casting method.

[2. Droplet Discharging Result]

Figure 15:
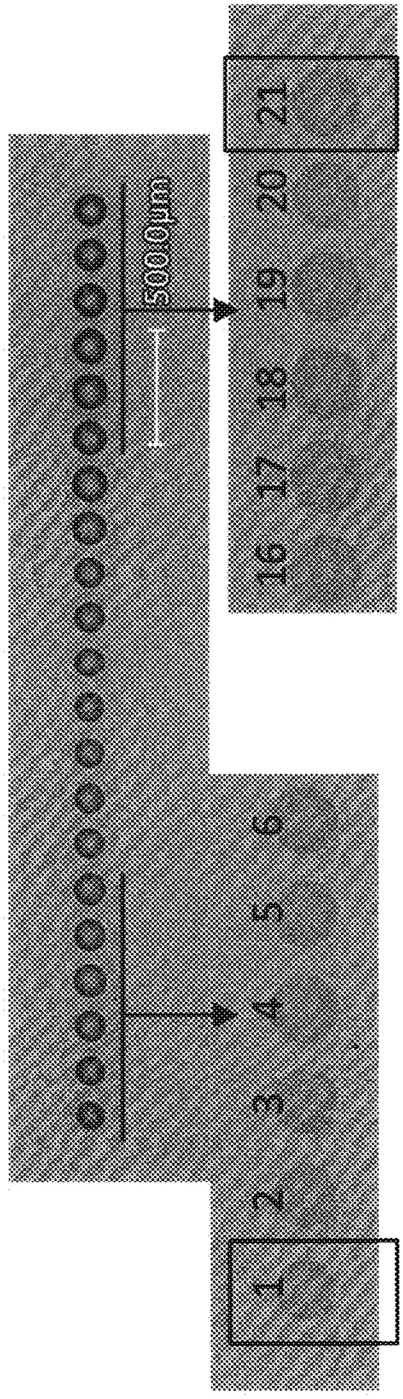
FIG. 15 is an optical micrograph of droplets ejected using a nozzle head of an example 1.
Figure 16:
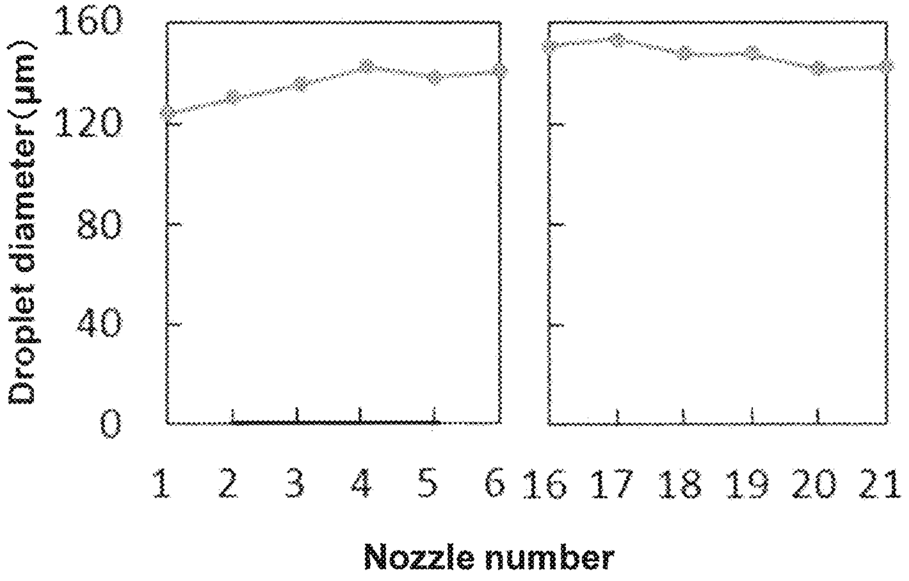
FIG. 16 is a graph showing the size of droplets ejected using a nozzle head according to the example 1.
Figure 17:
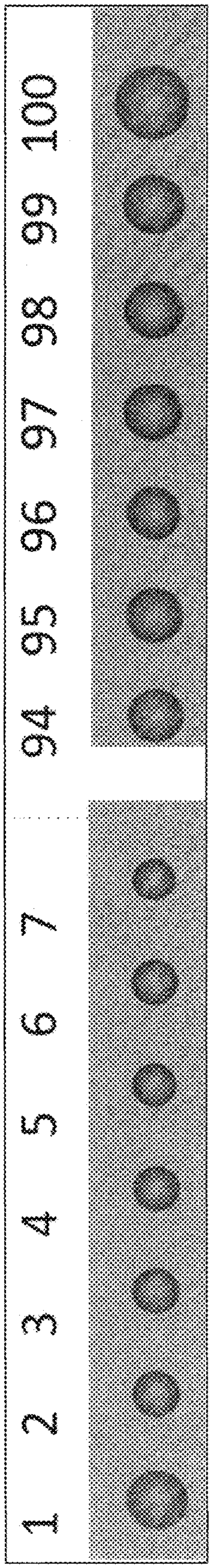
FIG. 17 is an optical micrograph of the droplets ejected using the nozzle head of a comparative example.
Figure 18:
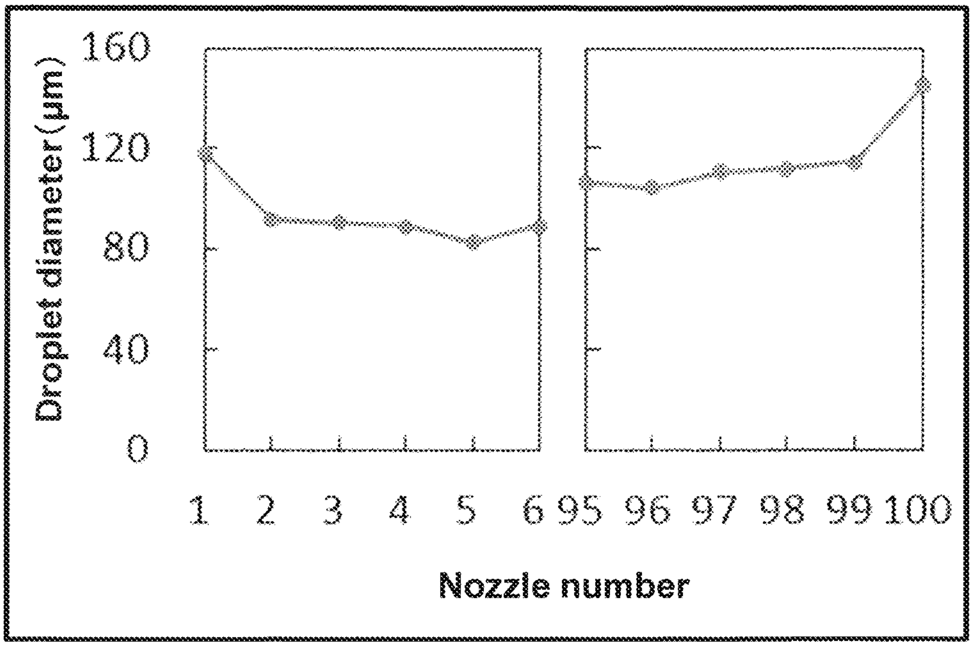
FIG. 18 is a graph showing the size of the discharging droplets using the nozzle head of the comparative example.

FIG. 15 is an optical micrograph of droplets ejected using the nozzle head of the example 1. FIG. 16 is a graph showing a size (diameter) of the droplets ejected using the nozzle head of the example 1. FIG. 17 is an optical micrograph of droplets ejected using the nozzle head of the comparative example. FIG. 18 is a graph showing a size (diameter) of the droplets ejected using the nozzle head of the comparative example.

As shown in FIG. 17 and FIG. 18, in the case where the nozzle head of the comparative example is used, the droplet ejected from the first droplet discharging nozzle is 43% larger than the droplet ejected from the fifth droplet discharging nozzle. In addition, the droplet ejected from the one-hundredth droplet discharging nozzle is 39% larger than the droplet ejected from the ninety-sixth droplet discharging nozzle.

On the other hand, as shown in FIG. 15 and FIG. 16, in the case where the nozzle head of the first embodiment is used, the droplet ejected from the first droplet discharging nozzle is 13% larger than the droplet ejected from the fourth droplet discharging nozzle. Further, the droplet ejected from the twenty-first droplet discharging nozzle is 7% larger than the droplet ejected from the seventeenth droplet discharging nozzle.

Therefore, it was confirmed that, by using the nozzle head of the example 1 according to the embodiment of the present disclosure, the size of the droplet to be ejected can be made uniform as compared with the nozzle head of the comparative example.

[Modification]

Within the scope of the present disclosure, those skilled in the art can conceive of various modifications and examples, and it is understood that these modifications and examples also fall within the scope of the present disclosure. For example, a person skilled in the art may appropriately add, delete, combine or make changes in the design of each embodiment, or add, omit, or make changes in conditions to the embodiments described above are such changes are included in the scope of the present disclosure as long as the present disclosure is provided.

In the first embodiment of the present disclosure, although the pseudo-nozzle 155 has the same shape as the droplet discharging nozzle 153, the present disclosure is not limited thereto. The pseudo-nozzle 155 may have a different shape from the droplet discharging nozzle 153, For example, it may have a rectangular shape, a conical shape, or a semi-circular shape. That is, the pseudo-nozzle 155 may have a shape protruding from the plate portion 151.

In the first embodiment of the present disclosure, although the distance D1 between the adjacent droplet discharging nozzles, the distance D2 between the adjacent droplet discharging nozzles 153 and the pseudo-nozzle 155, and the distance D3 between the adjacent pseudo-nozzles 155 are the same, the present disclosure is not limited thereto. The distance D1 between adjacent droplet discharging nozzles, the distance D2 between adjacent droplet discharging nozzles 153 and the pseudo-nozzle 155, and the distance D3 between adjacent pseudo-nozzles 155 may be different from each other. For example, the distance D3 between adjacent pseudo-nozzles 155 may be smaller than the distance D1 between adjacent droplet discharging nozzles and the distance D2 between adjacent droplet discharging nozzles 153 and pseudo-nozzles 155. Thereby, a uniformity of the electric field can be enhanced.

What is claimed is:

1. A nozzle head comprising:

a plate portion having a through hole;

a droplet discharging nozzle portion located corresponding to the through hole in the plate portion, the droplet discharging nozzle portion including a plurality of droplet discharging nozzles discharging droplets by an electrostatic discharging method; and a pseudo-nozzle portion located around the droplet discharging nozzle portion in the plate portion and including a plurality of pseudo-nozzles whose tips are blocked, wherein each of the droplet discharging nozzle and the pseudo-nozzle has a tapered shape, wherein an inner diameter of an opening at a tip end of each droplet discharging nozzle is 50 μm or less, and wherein a first height from the plate portion to the tip of the pseudo-nozzle is lower than a second height from the plate portion to the tip of the droplet discharging nozzle.

2. The nozzle head according to claim 1, wherein the plurality of droplet discharging nozzles are arranged in line in a first direction, and the pseudo-nozzle portion is arranged on both sides of the droplet discharging nozzle portion in the first direction.

3. The nozzle head according to claim 2, wherein the plurality of pseudo-nozzles are arranged over the entire range of 1 mm to 5 mm toward the first direction from the outermost pseudo-nozzle.

4. The nozzle head according to claim 2, wherein the pseudo-nozzle portion includes five or more pseudo-nozzles on both sides of the droplet discharging nozzle portion in the first direction.

5. The nozzle head according to claim 1, wherein a first distance between adjacent droplet discharging nozzles is the same as a second distance between adjacent pseudo-nozzles.

6. The nozzle head according to claim 1, wherein the plurality of droplet discharging nozzles are arranged in the first direction and in a second direction intersecting the first direction, and the pseudo-nozzle portion is arranged to surround the droplet discharging nozzle portion.

7. The nozzle head according to claim 6, wherein the pseudo-nozzles are arranged in line on both sides in the first direction and on both sides in the second direction corresponding to each of the droplet discharging nozzles arranged outside of the plurality of droplet discharging nozzles, and the number of the pseudo-nozzles per row arranged on one side in the first direction and on one side in the second direction is 2 or more and 30 or less.

8. The nozzle head according to claim 6, wherein the pseudo-nozzle has a frame shape.

9. A droplet discharging system comprising:

the nozzle head according to claim 1.

* * * * *